(12) United States Patent
Bai et al.

(10) Patent No.: US 12,348,587 B2
(45) Date of Patent: Jul. 1, 2025

(54) INPUT/OUTPUT (I/O) PERFORMANCE IN REMOTE COMPUTING ENVIRONMENTS USING A MINI-FILTER DRIVER

(71) Applicant: Omnissa, LLC, Mountain View, CA (US)

(72) Inventors: Wu Bai, Beijing (CN); Haiwei Zhao, Beijing (CN); Weigang Huang, Beijing (CN); Feng Yan, Beijing (CN); Kun Shi, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 214 days.

(21) Appl. No.: 17/936,615

(22) Filed: Sep. 29, 2022

(65) Prior Publication Data
US 2024/0022634 A1  Jan. 18, 2024

(30) Foreign Application Priority Data
Jul. 18, 2022  (WO) ................ PCT/CN2022/106178

(51) Int. Cl.
*H04L 67/14* (2022.01)
*H04L 67/568* (2022.01)
*H04L 67/5681* (2022.01)
*H04L 67/01* (2022.01)
*H04L 67/1095* (2022.01)

(52) U.S. Cl.
CPC ............ *H04L 67/14* (2013.01); *H04L 67/568* (2022.05); *H04L 67/5681* (2022.05); *H04L 67/01* (2022.05); *H04L 67/1095* (2013.01)

(58) Field of Classification Search
CPC ... H04L 67/14; H04L 67/568; H04L 67/5681; H04L 67/01; H04L 67/1097
See application file for complete search history.

(56) References Cited

U.S. PATENT DOCUMENTS

| | | | |
|---|---|---|---|
| 9,544,351 B1 * | 1/2017 | Lee | H04L 65/65 |
| 2013/0103729 A1 * | 4/2013 | Cooney | G06F 16/252 |
| | | | 707/831 |
| 2015/0371142 A1 * | 12/2015 | Jain | G06N 5/048 |
| | | | 706/52 |
| 2017/0286421 A1 * | 10/2017 | Hayenga | G06F 21/75 |
| 2018/0060256 A1 * | 3/2018 | Walker | G06F 13/1642 |
| 2021/0176304 A1 * | 6/2021 | Muthiah | H04L 67/1021 |

* cited by examiner

*Primary Examiner* — Christopher B Robinson
*Assistant Examiner* — Angela Widhalm De Rodriguez
(74) *Attorney, Agent, or Firm* — Kim & Stewart LLP (57) ABSTRACT

The disclosure provides a method of associating thread identifiers (IDs) to input/output (I/O) requests in a remote computing environment. The method generally includes receiving, by a mini-filter on a remote device that is remote from a client device, a request from an application on the remote device to access resources at the client device, determining, by the mini-filter, a thread identifier (ID) associated with the request, the thread ID corresponding to an application thread of the application that generated the request, determining, by the mini-filter, one or more parameters of the request, and transmitting, by the mini-filter, to a redirection server process on the remote device, a message comprising the thread ID and the one or more parameters of the request, wherein the thread ID and the one or more parameters of the request are added to a cache maintained by the redirection server process.

20 Claims, 5 Drawing Sheets

INPUT/OUTPUT (I/O) PERFORMANCE IN REMOTE COMPUTING ENVIRONMENTS USING A MINI-FILTER DRIVER

CROSS-REFERENCE TO RELATED APPLICATIONS

This application claims priority to International Patent Application No. PCT/CN/2022/106178, filed Jul. 18, 2022, entitled "IMPROVING INPUT/OUTPUT (I/O) PERFORMANCE IN REMOTE COMPUTING ENVIRONMENTS USING A MINI-FILTER DRIVER", and assigned to the assignee hereof, the contents of each of which are hereby incorporated by reference in its entirety.

BACKGROUND

In a virtual desktop infrastructure (VDI) environment, a local client device can access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running.

In some cases, a storage device associated with the client device may be used to store local files and/or folder. In certain aspects, the virtual desktop or remote application on the remote device may access such files and/or folders stored on the storage device at the client device. In particular, storage input/output (I/O) read requests made by the virtual desktop, or remote application running on the virtual desktop, may be packaged in I/O request packets (IRPs), provided to a driver on the remote device, and sent to the client device in order to retrieve files and/or folders stored on the storage device. The client device may send the requested files and/or folders back to the remote device in response to receiving the request. In other words, requested files and/or folders are redirected from the client device to the virtual desktop, such that a user may access the files and/or folders on the virtual desktop like a mounted network drive. A network drive is a type of computer drive or storage device, also known as a mapped drive, that is shared on another computing device on the same network, such as a local area network (LAN). Unlike a local drive, a network drive may only be accessible over the network.

The network traffic required to transmit such I/O requests and responses between the remote device and the client device may be substantial, and may, in some cases, result in latency and poor performance. For example, an I/O request generated by a remote application at the remote device may be for a file stored as a plurality of data blocks at the client device. Thus, the I/O request may be broken into separate requests to retrieve each of the data blocks which make up the file, thereby resulting in a large number of I/O requests. As such, a significant amount of network traffic between the virtual desktop and the client device may result from multiple I/O requests being generated by multiple remote applications at the remote device. Further, any network connection issues (e.g., if the network connection is throttled or otherwise operates at a reduced speed) may result in further decreased performance. Such poor storage I/O performance may significantly reduce the ability of a virtual desktop or other remotely-located application to function as intended.

SUMMARY

A method of associating thread identifiers (IDs) to input/output (I/O) requests in a remote computing environment is provided. The method includes receiving, by a mini-filter on a remote device that is remote from a client device, a request from an application on the remote device to access resources at the client device, determining, by the mini-filter, a thread ID associated with the request, the thread ID corresponding to an application thread of the application that generated the request, determining, by the mini-filter, one or more parameters of the request, and transmitting, by the mini-filter, to a redirection server process on the remote device, a message comprising the thread ID and the one or more parameters of the request, wherein the thread ID and the one or more parameters of the request are added to a cache maintained by the redirection server process.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for improving input/output (I/O) performance in a remote computing environment using a mini-filter driver. In some cases, a physical storage device connected to a client device may store data accessed by an application (e.g., virtual desktop or other application) located on a remote device in a remote computing environment. As such, storage I/O operations performed by the application on the remote device with respect to the physical storage device may be redirected to the client device in order to read data from (or write data to) the physical storage device, including opening one or more files and/or folders located on the client device.

Accordingly, the remote computing environment may be enabled with redirection features (referred to herein as "redirection server processes" and "redirection client processes") that allow for files and/or folders on a client device to be shared with remote devices and/or remote applications located on the remote devices. To implement such redirection features, a driver (referred to herein as a "redirection driver") may be installed in a kernel of a guest operating system (OS) of a virtual computing instance (VCI) on the remote device. A driver refers to a software program that supports communication between the OS of the VCI and hardware and/or other connected devices. Certain techniques for device redirection, such as OS event redirection, in a VDI environment are described in more detail in U.S. patent application Ser. No. 16/444,840, the contents of which are incorporated by reference herein in their entirety.

Conventional techniques for handling I/O read operations ("I/Os") in remote computing environments may involve the transmission of a substantial number of separate packets (e.g., I/O request packets (IRPs)) over a network between the client device and the remote device to (1) request one or more blocks of data (e.g., for a file and/or folder) and (2) respond to the request, such that the one or more blocks of data local to the client device can be shared with and accessed by the remote device (e.g., as a mounted network drive). Each individual I/O request may be broken down into a potentially large number of smaller requests, each of which is separately transmitted over the network and receives a separate response over the network (and in some cases, is followed by an acknowledgment of the response). This substantial amount of network traffic may result in poor storage I/O performance, particularly in cases where a network connection is experiencing high amounts of latency.

Improved techniques for handling such I/Os may be used to reduce a number of round-trip I/O requests and responses (e.g., from the remote device to the client device and back to the remote device). One technique may include pre-fetching data blocks associated with a requested file (or folder), such as pre-fetching data blocks that have not yet been specifically requested but that are contiguous in memory with data blocks that have been requested (e.g., pre-fetching one or more data blocks that immediately follow the data block most recently requested). Pre-fetching data blocks of a file may help to reduce the cost of repeatedly accessing the client device to respond to subsequent I/O requests associated with the file (e.g., requesting subsequent data blocks of the file). However, to perform such pre-fetching techniques in a remote computing context, knowledge of a thread identifier (ID) associated with each I/O request may be necessary to ensure that data blocks that are pre-fetched for a particular thread are associated with that thread.

For example, an I/O request generated by a remote application may be assigned a thread ID corresponding to an application thread associated with the application. The thread ID assigned to the I/O request may be unique to the application (e.g., another application generating an I/O request for a file and/or folder located on the client device may be assigned a different thread ID). Further, as mentioned, each individual I/O request may be broken down into a larger number of smaller requests, and each smaller request may be separately assigned the same thread ID. As such, I/O requests for a same file (or folder) from a same application may be assigned a same thread ID. Multiple remote applications may generate I/O requests for different files (and/or folders) at the client device, and such requests may be filtered by the system based on their thread ID to understand which requests belong to which application, and/or which requests are for a same file and/or folder. Accordingly, based on the thread ID, the system may be capable of determining which requests are from a same thread for purposes of pre-fetching (e.g., to reduce an amount of I/O round trips for a same file and/or folder). Pre-fetching is just one of many techniques used to improve I/O performance that may be enabled through knowledge of a thread ID associated with each I/O request. For example, another technique used to improve I/O performance that may be enabled through knowledge of a thread ID includes caching, or the process of storing data in a temporary storage area (e.g., a cache) such that cached content may be accessed more quickly.

However, I/O requests generated by one or more applications in the remote computing environment, which are submitted to the redirection driver (e.g., for redirection to the client device), and subsequently to the redirection server process, may not include information about a thread ID associated with the request. As such, the redirection server process may be unaware of (1) which application the request belongs to and/or (2) whether the request is related to one or more other requests received by the redirection server process (e.g., for purposes of performing pre-fetching).

Accordingly, techniques described herein may be implemented to maintain a mapping of thread IDs associated with I/O requests accessing the redirection driver via the redirection server process. For example, a mini-filter may be introduced on a remote device to intercept I/O operations (from one or more remote applications on the remote device) before those I/O operations are re-directed to a client device for servicing, such that a thread ID associated with each of these I/O operations may be determined and stored at the redirection server process. More specifically, the mini-filter may be used to intercept an IRP_MJ_CREATE I/O request requesting access to a file and/or folder on the client device (e.g., such that the file and/or folder can be opened at the remote device). The mini-filter may determine a thread context of the I/O request, such as a thread ID corresponding to an application thread of the application that generated the request. In certain aspects, the mini-filter may also determine CREATE parameters and/or a CREATE file path of the intercepted IRP_MJ_CREATE I/O request. The mini-filter may package and transmit this information (e.g., the thread ID, the CREATE parameters, and/or the CREATE file path) to the redirection server process where the redirection server process stores such information in a thread context map (e.g., a cache) maintained at the redirection server process. In certain aspects, the information may be stored as a key-value mapping in the thread context map, the mapping being between (1) the key, which includes the CREATE parameters and/or CREATE file path of the I/O request and (2) the value, which is the thread context (e.g., thread ID) associated with the I/O request.

Maintaining such key-value mappings in the thread context map at the redirection server process may help the redirection server process to associate a thread context of an IRP_MJ_CREATE I/O request forwarded to the redirection server process from the redirection driver. The request forwarded by the redirection driver may not include a thread context associated with the IRP_MJ_CREATE I/O request. Instead, the redirection server process may query the thread context map to determine a thread context associated with the received IRP_MJ_CREATE I/O request. In other words, the redirection server process may use the CREATE parameters and/or CREATE file path of the IRP_MJ_CREATE I/O request received from the redirection driver as a key to determine a thread context (e.g., the value) associated with that key. On the other hand, other I/O requests (e.g., READ, WRITE, QUERY_FILE_INFO, CLOSE, and/or etc.) forwarded to the redirection server process from the redirection driver may include a unique file ID. This unique file may be used query a thread context of these other I/O requests.

To receive thread context information associated with I/O requests generated by one or more remote applications in a particular remote desktop session (referred to herein as a "session"), the mini-filter may need to first establish communication between the mini-filter and a redirection server process of the particular session. In particular, one redirection server process may exist for each remote desktop session (which may be interchangeably referred to herein as a "session"). A session is established when a user or administrator employs remote desktop protocol (RDP) client software at a client device to connect to a remote device running RDP agent software. A user or administrator may establish multiple sessions with multiple remote devices, where one or more remote applications are running. Each session may be identified by a unique session ID. For each session created, the mini-filter may create a client communication port to communicate with a redirection server process of the session. After creation of the port, a remote desktop service (RDS) plugin, may launch the redirection server process of the session and assign the client communication port to the redirection server process to enable communication between the process and the mini-filter.

In certain aspects, multiple sessions may use redirection server processes simultaneously. As such, the mini-filter may establish multiple communication ports with multiple redirection server processes (of multiple sessions) to provide thread context to each of these redirection server processes when remote applications, in sessions associated with the processes, generate I/O requests. When receiving an I/O request from an application of a particular session, to determine which communication port the redirections server process is to use for communicating such thread context (e.g., to a redirection server process of the session), the mini-filter may refer to key-value mappings of <session ID, connection context> maintained by the mini-filter (e.g., in a communication context pool maintained by the mini-filter). In particular, the receive I/O request may be associated with a session ID. The mini-filter may use the session ID to determine a connection context mapped to this session ID, which includes at least information about a communication port that the mini-filter is to use for communicating thread context to the associated redirection server process.

Though certain aspects are described with respect to I/O read operations, the techniques described herein may similarly be used for I/O write operations to associate a thread ID with each I/O write operations. Further, it is noted that while certain aspects are described herein with respect to a VDI environment, the techniques herein may be applied to other suitable environments.

Figure 1:
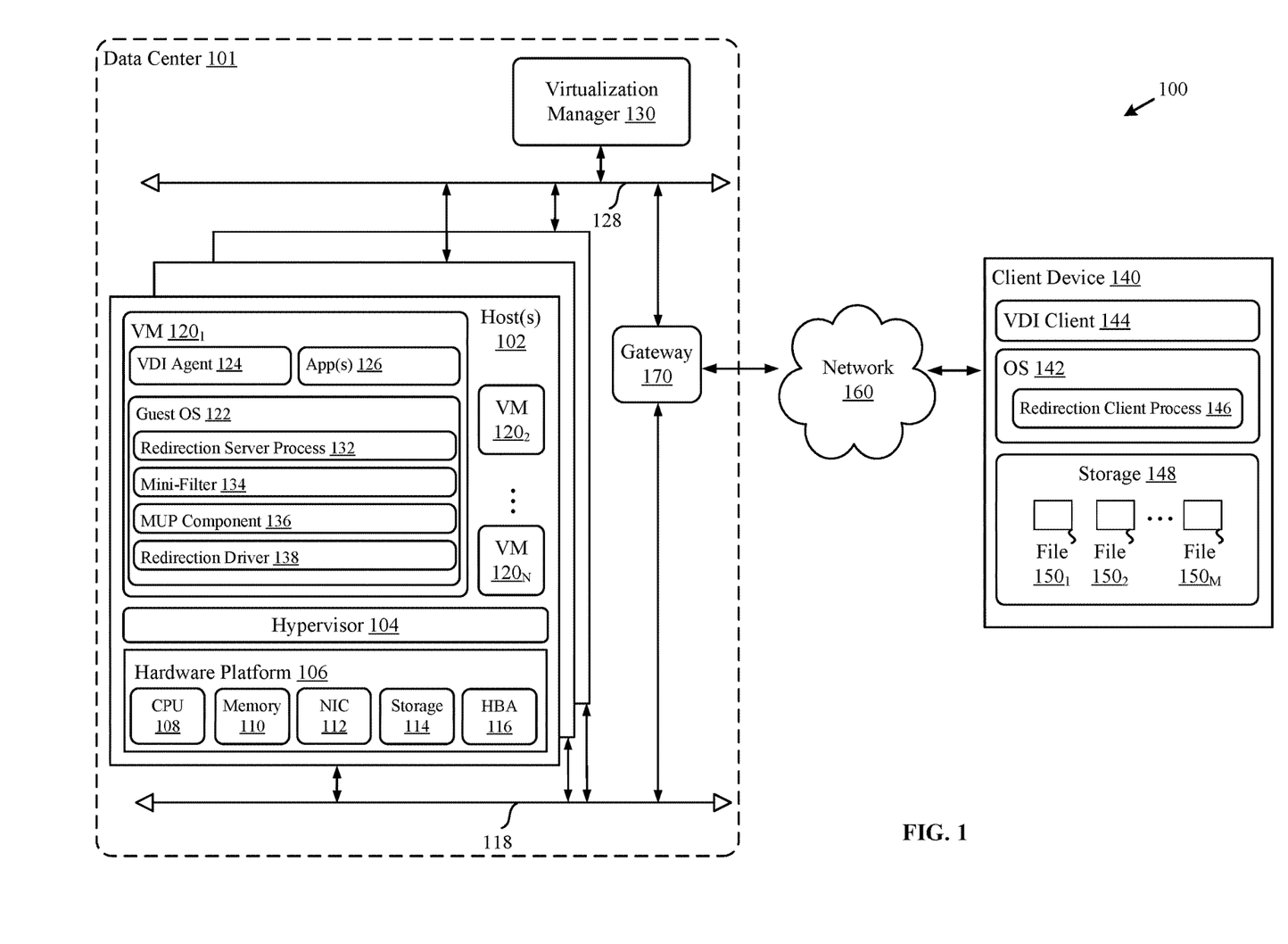
FIG. 1 depicts a block diagram of a virtualized desktop infrastructure (VDI) system in which one or more embodiments according to the present disclosure may be implemented.

FIG. 1 depicts a block diagram of a virtualized desktop infrastructure (VDI) system 100 in which one or more embodiments according to the present disclosure may be implemented. VDI system 100 comprises at least one client device 140 and a data center 101, connected by a network 160. Network 160 may be, for example, a direct link, a local area network (LAN), a wide area network (WAN) such as the Internet, another type of network, or a combination of these.

Client device 140 is a physical device, such as a general purpose desktop computer or mobile computer. A mobile computer may be, for example, a laptop, a mobile phone, or a tablet computer. Client device 140 includes VDI client 144, OS 142, and storage 148. In certain aspects, VDI client 144 runs on top of OS 142. OS 142 may be a standard, commodity operating system. In certain aspects, OS 142 includes redirection client process 146.

VDI client 144 is a user-side interface of a virtualized desktop running on one of virtual machines (VMs) 120. Though certain aspects are described herein with respect to a virtual desktop running on a VM, the techniques may similarly be used for a virtual desktop or application running on other types of VCIs, such as containers, or on physical computing devices. As used herein, a "virtualized desktop" or "remote desktop" is a desktop running on, for example, one of VMs 120 that is displayed remotely on client device 140, as though the remote desktop were running on client device 140. By opening VDI client 144, a user of client device 140 accesses, through network 160, a remote desktop running in remote data center 101, from any location, using client device 140. Frames of the remote desktop running on VM 120 are transmitted to VDI client 144 using a desktop delivery protocol such as VMware® Blast™, or Microsoft® Remote Desktop Protocol (RDP)™.

After transmission, the frames are displayed on client device 140 for interaction by the user. Client device 140 sends user inputs to VM 120 for processing on VM 120 of data center 101, taking processing load off client device 140. Such centralized and automated management of remote desktops provides increased control and cost savings. VDI client 144 may be, for example, VMware® View™, or another special purpose thin client. As the user interacts with the virtual desktop, such as using a mouse and keyboard and/or other peripheral devices, the user input events may be redirected by VDI client 144 to VDI agent 124.

Client device 140 further comprises storage 148. Storage 148 represents persistent storage devices (e.g., one or more hard disks, flash memory modules, solid state disks (SSDs), and/or optical disks) at client device 140. In one example embodiment, files $150_1$, $150_2$, through $150_M$ (collectively referred to herein as files 150 and individually referred to herein as file 150) are stored in storage 148. In certain aspects, files 150 are stored in one or more folders on storage 148.

In certain aspects, OS 142 includes a redirection client process 146 to allow a virtual desktop (e.g., running on a VM 120 on host 102 in data center 101) to access resources, such as files and/or folders in storage 148, at client device 140. For example, an application 126 running on VM 120 may request to open a file 150 in storage 148, which is remote from VM 120. Operations of redirection client process 146 to allow a virtual desktop to access such remote files 150 and/or folder are described in more detail below.

Data center 101 includes host(s) 102, a virtualization manager 130, a gateway 170, a management network 128, and a data network 118. Although management network 128 and data network 118 are shown as separate physical networks, it is also possible in some aspects to logically isolate management network 128 from data network 118 using different virtual local area network (VLAN) identifiers. Each of hosts 102 may be constructed on a server grade hardware platform 106, such as an x86 architecture platform. For example, hosts 102 may be geographically co-located servers on the same rack.

Host 102 is configured to provide a virtualization layer, also referred to as a hypervisor 104, that abstracts processor, memory, storage, and networking resources of hardware platform 106 into multiple VMs $120_1$ to $120_N$ (collectively referred to as VMs 120 and individually referred to as VM 120) that run concurrently on the same host 102. Hypervisor 104 may run on top of OS in host 102. In some embodiments, hypervisor 104 can be installed as system level software directly on hardware platform 106 of host 102 (often referred to as "bare metal" installation) and be conceptually interposed between the physical hardware and the guest operating systems executing in the virtual machines. In some implementations, hypervisor 104 may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs 120, the teachings herein also apply to other types of VCIs, such as containers, Docker containers, data compute nodes, isolated user space instances, namespace containers, and the like. One example of a hypervisor 104 that may be used is a VMware ESXi™ hypervisor provided as part of the VMware vSphere® solution made commercially available from VMware, Inc. of Palo Alto, California.

Each VM 120 includes a guest OS 122, one or more applications 126, and a VDI agent 124. Application(s) 126 and VDI agent 124 run on top of guest OS 122. Guest OS 122 may be a standard, commodity operating system. An application 126 may be any software program, such as a word processing program.

VDI agent 124 is a desktop virtualization program that connects to VDI client 144 of client device 140, through network 160. The connection between VDI agent 124 and VDI client 144 may be authenticated, such as through a username and password combination pertaining to client device 140 or to a user of client device 140. VDI agent 124 transmits, to VDI client 144, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 144. The metadata may include x and y coordinate locations of a mouse cursor, x and y coordinates and size of windows of application(s) 126 open on the remote desktop, which application(s) 126 are running on and/or displayed on the remote desktop of VM 120, and/or other information.

In certain aspects, OS 122 includes a redirection server process 132 to allow a remote desktop (e.g., running on a VM 120 on host 102 in data center 101) to access resources, such as files and/or folders in storage 148, at client device 140. For example, an application 126 running on VM 120 may request to open a file 150 in storage 148, which is remote from VM 120. Accordingly, redirection server process 132 on VM 120 and redirection client process on client device 140 may be configured to perform such I/O redirection.

For example, a virtual channel may be established between redirection server process 132 and redirection client process 146. In some cases, communication between redirection server process 132 and redirection client process 146 is facilitated by VDI agent 124 and VDI client 144. As described in more detail below with respect to FIG. 2, redirection server process 132 may transmit I/O requests from applications 126 running on VM 120 (e.g., a same VM 120 where redirection server process 132 is running) to redirection client process 146 (e.g., in some cases, with the help of VDI Agent 124 and VDI client 144) to open files 150 and/or folders local to client device 140. Redirection client process 146 may receive the I/O requests, and may send the corresponding I/O requests to storage device 140. Redirection client process 146 may send results of the I/O operations to applications 126, on VM 120, requesting the files 150 and/or folder.

It is noted that while redirection server process 132 is depicted separately from VDI agent 124, redirection server process 132 may alternatively be included within VDI agent 124. Similarly, it is noted that while redirection client process 146 is depicted separately from VDI client 144, redirection client process 146 may alternatively be included within VDI client 144.

According to aspects described herein, one redirection server process 132 may exist for each remote desktop session. A remote desktop session is established when a user and/or an administrator opens VDI client 144 of client device 140 to access and connect, through network 160, to a remote desktop running (e.g., on VM 120) in remote data center 101, and more specifically, to VDI agent 124 of the remote desktop. A user and/or an administrator may establish multiple sessions between VDI client 144 of client device 140 and VDI agents 124 running on different remote desktops. As such, multiple redirection server processes 132 may exist, with one redirection server process 132 per session. One example of a redirection server process 132 that may be used is a VMware Client Drive Redirection (CDR) feature provided as part of the VMware Horizon® solution made commercially available from VMware, Inc. of Palo Alto, California.

To implement such redirection features of redirection server processor 132, a redirection driver 138 may be installed in a kernel of OS 122 of VM 120. Redirection driver 138 is a device driver which handles device redirection for RDP sessions. As described in more detail below with respect to FIG. 4, redirection driver 138 may be configured to forward I/O requests from applications 126 (and in some cases, from mini-filter 134 and multiple uniform naming convention (UNC) provider (MUP) component 136) to redirection server process 132 for redirection of the I/O to client device 140. One example of a redirection driver 138 that may be used is a Microsoft Driver RDPDR (Remote Desktop Protocol Device Redirector driver) made commercially available from Microsoft Corporation of Redmond, Washington.

In certain aspects, OS 122 includes MUP component 136. MUP component 136 is a kernel-mode component that fields I/O requests destined for a file or a device that has a UNC name (e.g., names beginning with the characters \\, indicating that the resource exists on the network). MUP component 136 is a device driver (e.g., loaded at system boot time) that issues I/O requests, from applications 126 (and in some cases from mini-filter 134) to lower-layer drivers, in this case, to redirection driver 138. In particular, MUP component 136 may be responsible for channeling remote file system accesses using a UNC name to redirection driver 138, capable of handling the remote file system requests.

In certain aspects, OS 122 further includes a mini-filter 134. Mini-filter 134 is a kernel-mode, file system filter driver or file system driver, configured to intercept I/O requests from applications 126 requesting to access native resources (e.g., files 150 and/or folders) on client device 140. In certain aspects, mini-filter 134 is configured to filter IRP_MJ_CREATE I/O requests out from all I/O requests received from applications 126. In certain aspects, mini-filter 134 is configured to determine a thread context of an intercepted IRP_MJ_CREATE I/O request and provide such information to a redirection server process 132 associated with a session from which the I/O request originated (e.g., from an application 126 in the session). As described in more detail below with respect to FIG. 4, providing the thread context of an IRP_MJ_CREATE I/O request to redirection server process 132 may allow redirection server process 132 to associate a thread context with IRP_MJ_CREATE I/O requests received from redirection driver 138. In certain aspects, mini-filter 134 is configured to provide intercepted I/O requests, including IRP_MJ_CREATE I/O requests, to MUP component 136 (e.g., to be transferred to redirection driver 138, and further to redirection server process 132).

Hardware platform 106 of each host 102 includes components of a computing device such as one or more processors (CPUs) 108, memory 110, a network interface controller including one or more network adapters, also referred to as Network Interface Controllers (NICs) 112, storage system 114, a host bus adapter (HBA) 115, and other input/output (I/O) devices such as, for example, a mouse and keyboard (not shown). CPU 108 is configured to execute instructions, for example, executable instructions that perform one or more operations described herein and that may be stored in memory 110 and in storage system 114. NIC 112 enables host 102 to communicate with other devices via a communication medium, such as management network 128 and/or data network 118. Storage system 114 represents persistent storage devices (e.g., one or more hard disks, flash memory modules, solid state disks (SSDs), and/or optical disks). HBA 115 couples host 102 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 102 via a network, shown as management network 128, and carries out administrative tasks for data center 101 such as managing hosts 102, managing VMs 120 running within each host 102, provisioning VMs, migrating VMs from one host to another host, and load balancing between hosts 102. Virtualization manager 130 may be a computer program that resides and executes in a central server in data center 101 or, alternatively, virtualization manager 130 may run as a virtual appliance (e.g., a VM 120) in one of hosts 102. One example of a virtualization manager is the vCenter Server™ product made available from VMware, Inc. of Palo Alto, California.

Gateway 170 provides VMs 120 and other components in data center 101 with connectivity to network 160. Gateway 170 may manage external public IP addresses for VMs 120, route traffic incoming to and outgoing from data center 101, and provide networking services, such as firewalls, network address translation (NAT), dynamic host configuration protocol (DHCP), and load balancing. Gateway 170 uses data network 118 to transmit data network packets to hosts 102. Gateway 170 may be a VCI, a physical device, or a software module running within host 102. Gateway 170 may include two gateways: a management gateway for management network 128 and a data gateway for data network 118.

Figure 2:
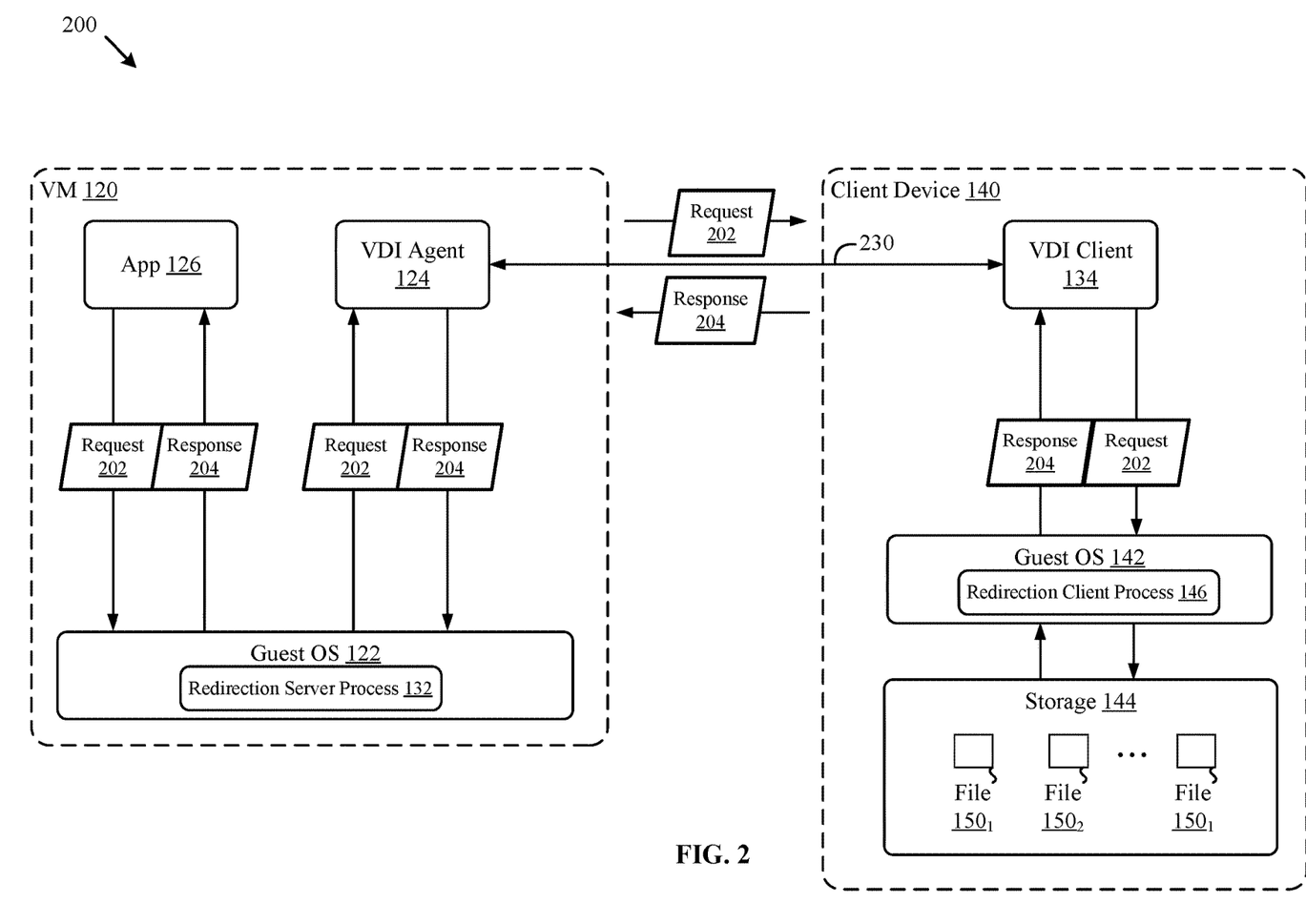
FIG. 2 depicts an example round-trip of an input/output (I/O) request when client drive redirection is enabled between a remote desktop and a client device in a VDI system.

FIG. 2 depicts an example round-trip 200 of an I/O request when client drive redirection is enabled between a remote device and a client device in a VDI system. Client drive redirection may allow local files and/or folders on a client device (e.g., such as files 150 on client device 140 in FIG. 1) to be shared with an application running on a remote desktop (e.g., such as application 126 running on a remote desktop on VM 120 on host 102 in FIG. 1). Through client drive redirection, local files and/or folders on the client device are redirected to the remote desktop, thereby allowing a user to access the local files and/or folders in the remote desktop like a mounted network drive.

As mentioned, aspects of the present disclosure implement a mini-filter on the remote device for purposes of intercepting I/O requests (more specifically, IRP_MJ_CREATE I/O requests from remote applications on the remote device) before those I/O requests are re-directed to the client device for servicing, such that a thread context for each of the I/O requests may be maintained in a thread context map (e.g., a cache). However, example round-trip 200 of the I/O request illustrated in FIG. 2 illustrates a scenario where a mini-filter, such as mini-filter 134 in FIG. 1, has not yet been implemented.

As shown in FIG. 2, a remote desktop session is established between a remote desktop running on VM 120 (in host 102) and client device 140. Further, a redirection server process 132 and a redirection client process 146 are launched at the remote desktop on VM 120 and client device 140, respectively, for the session.

An application 126 on the remote desktop generates an I/O request (shown as request 202 in FIG. 2). More specifically, an application thread of application 126 generates an IRP_MJ_CREATE I/O request to open a file 150 in storage 148 on client device 140. This request may be assigned a thread context (e.g., a thread ID) of the application thread generating the request. The thread context of the application thread may be unique to this particular thread of application 126 generating the I/O request.

To redirect the I/O request from VM 120 to client device 140, request 202 is first transmitted to guest OS 122. In particular, the request 202 is transmitted to a file system, and subsequently redirection server process 132, of guest OS 122. The request 202 may not include the thread context assigned to request 202 when transmitted to guest OS 122.

Redirection server process 132 in guest OS 122 may be implemented to allow for such I/O redirection. In particular, redirection server process 132 on VM 120 may receive the I/O request and communicate with redirection client process 146 on client device 140 to transmit the I/O request and response between the remote desktop running on VM 120 and client device 140. In some cases, communication between redirection server process 132 and redirection client process 146 is facilitated by VDI agent 124 and VDI client 144. Accordingly, as shown in FIG. 2, request 202 received at redirection server process 132 may be forwarded to VDI agent 124 for transmission to client device 140.

VDI agent 124 transmits request 202 to VDI client 144, which is then forwarded to guest OS 142 of client device 140. More specifically, request 202 is transmitted to a file system, and subsequently redirection client process 146, of guest OS 122. Receipt of request 202, to open file 150, may trigger performance of the I/O operations requested on storage 148.

Results of performing the requested operations on storage 148 are transmitted as response 204 to VDI client 144, over a network to VDI agent 124 of VM 120, to guest OS 122, and returned to the requested application 126. Transfer of the I/O request 202 and response 204 between VM 120 and client device 140 represents a round-trip of a single I/O operation.

As discussed above, individual I/O requests from application 126 may be broken down into a potentially large number of smaller requests, each of which is separately transmitted over the network and receives a separate response over the network. As such, a substantial amount of network traffic may result due to the increased number of I/O round trips needed to service the I/O request from application 126 (and from one or more other applications 126, where the one or more other applications 126 are similarly making I/O requests for files and/or folders on client device 140). The substantial amount of network traffic may lead to poor I/O performance, particularly in cases where a network connection is experiencing high amounts of latency. Accordingly, in some cases, techniques, such as pre-fetching, may be implemented to help in reducing the number of round-trip I/O requests and responses to perform I/O operations requested by application 126 (and the one or more other applications). However, such techniques may require knowledge of a thread context (e.g., a thread ID) associated with each I/O request at redirections server process 132.

Per example round-trip 200, although a thread context (e.g., thread ID) may be assigned to the I/O request generated by an application thread of application 126, the thread context may not be communicated with redirection server process 132. As such, redirection server process 132, when receiving an I/O request to be redirected to client device 140, may not know a thread context of the I/O request; and thus, may not know (1) which application 126 issued the request and/or (2) whether other I/O requests received by redirection server process 132 are related to this I/O request (e.g., for purposes of performing pre-fetching).

Accordingly, aspects of the present disclosure introduce a mini-filter, such as mini-filter 134 illustrated in FIG. 1, on the remote device (e.g., on VM 120 on host 102) to intercept IRP_MJ_CREATE I/O requests (from the application threads of applications 126) before these I/O requests are transmitted to redirection server process 132 on the remote device, for redirection to client device 140. Mini-filter 134 may be configured to determine a thread context of each of the intercepted IRP_MJ_CREATE I/O requests and provide this information to redirection server process 132. Redirection server process 132 may store the thread context for each of the IRP_MJ_CREATE I/O requests such that when redirection server process 132 receives the IRP_MJ_CREATE I/O requests to be redirected to client device 140, redirection server process 132 may have knowledge of a thread context associated with each of these I/O requests.

To provide a thread context, to redirection server process 132, for each intercepted IRP_MJ_CREATE I/O request, mini-filter 134 may first need to establish a communication mechanism between mini-filter 134 and redirection server process 132. For example, mini-filter 134 may create a client communication port which is assigned to redirection server process 132, such that mini-filter 134 is able to communicate (e.g., communicate thread context for intercepted IRP_MJ_CREATE I/O requests) with redirection server process 132.

Further, in certain aspects, mini-filter 134 may establish a communication mechanism with multiple redirection server processes 132 (e.g., corresponding to each remote desktop session established), where multiple remote desktop sessions have been established. Accordingly, mini-filter 134 may maintain a mapping of session IDs and client communication ports, such that when mini-filter 134 intercepts an IRP_MJ_CREATE I/O request and determines its session ID and thread context, mini-filter 134 knows which client communication port to use for communicating this thread context to the correct redirection server process 132 associated with the session (e.g., for which the I/O request was created in).

Figure 3:
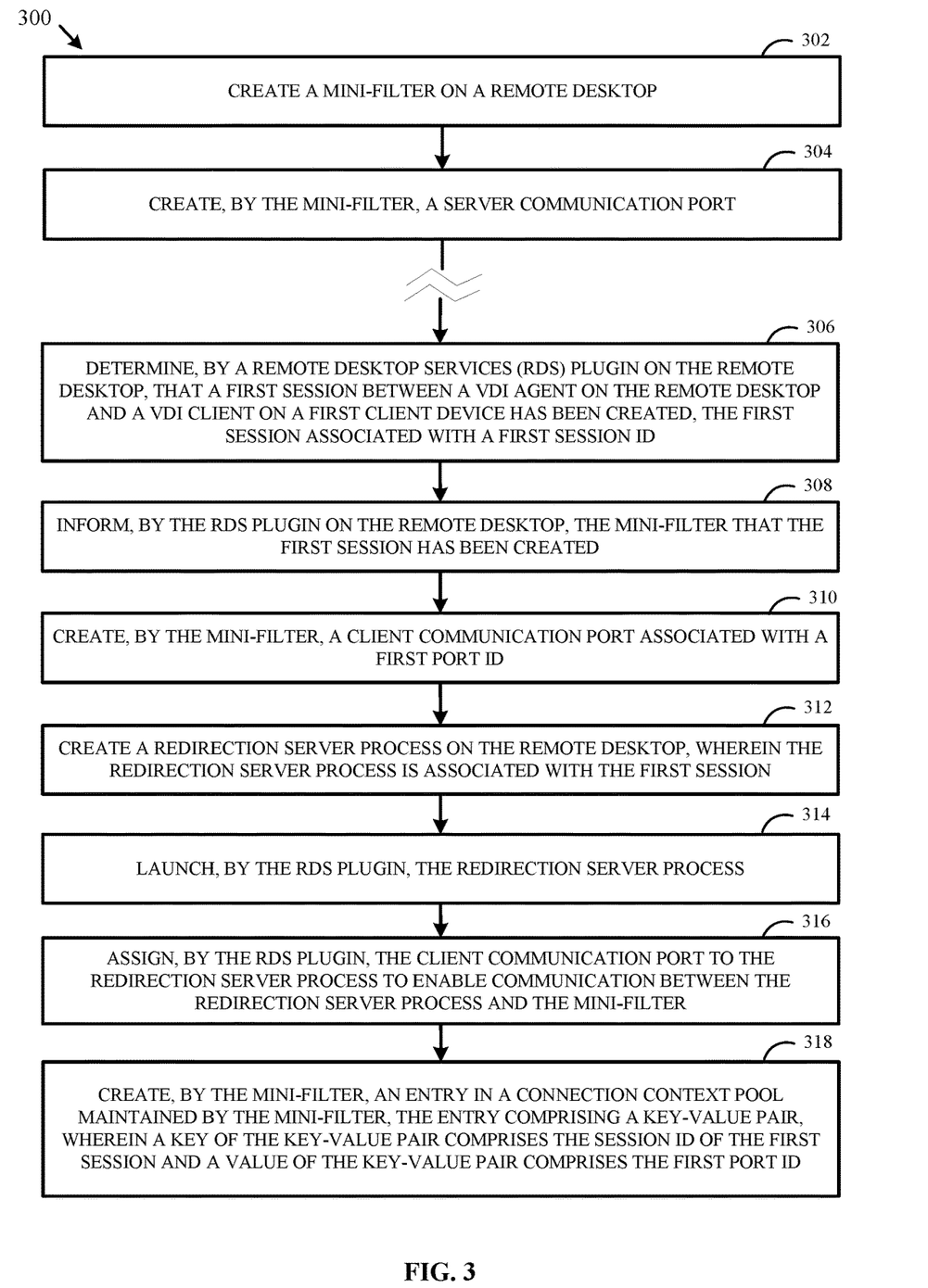
FIG. 3 depicts example operations for establishing a communication mechanism between a mini-filter and a redirection server process on a remote desktop.

FIG. 3 depicts example operations 300 for establishing a communication mechanism between a mini-filter and a redirection server process on a remote desktop. Operations 300 may be performed by one or more components on a remote desktop running on a VM. For example, operations 300 may be performed by mini-filter 134 on a remote desktop running on VM 120 in FIG. 1. Further, operations 300 may be performed by a remote desktop services (RDS) plugin hosted on the remote desktop. The RDS plugin is a software component configured to perform particular function(s) in the remote computing environment.

Operations 300 begin at operation 302 by creating (and launching) mini-filter 134 on the remote desktop. At operation 304, mini-filter 134 creates a server communication port. For example, mini-filter 134 may call an application programming interface (API) to create a server communication port such that mini-filter 134 is able to communicate with user-mode applications, such as applications 126, running on the remote desktop (e.g., for purposes of intercepting I/O requests from applications 126).

In certain aspects, after operation 304 is performed, a remote desktop session between client device 140 and the remote desktop may not exist. As such, no further operations may be performed. However, at a later time, a remote desktop session may be established between the remote desktop and client device 140. In particular, a first session between a VDI agent (e.g., such as VDI agent 124 in FIG. 1) on the remote desktop and a VDI client (e.g., such as VDI client 144 in FIG. 1) on client device 140 may be created. The first session may be associated with a first session ID.

At operation 306, the RDS plugin on the remote desktop determines that the first session between VDI agent 124 and VDI client 144 has been created. In certain aspects, the RDS plugin on the remote desktop is notified about the created session.

In response to determining that the first session has been created, at operation 308, the RDS plugin on the remote desktop informs mini-filter 134 that a new session has been established between the remote desktop and client device 140. In response, at operation 310, mini-filter 134 creates a client communication port associated with a first port ID. For example, mini-filter 134 creates the client communication port associated with the first port ID using a system call such as FltCreateCommunicationPort. Mini-filter 134 may control security of the client communication port. For example, in certain aspects, mini-filter 134 controls the security on the port by a creating a default security descriptor and applying the security descriptor to the client communication port such that only users with system or administrator privileges have access to the port (i.e., mini-filter 134 creates the client communication port with administrator privileges). As discussed in more detail below, this client communication port may be assigned to the newly created first session such that mini-filter 134 is able to communicate thread context information for I/O requests (e.g., IRP_MJ_CREATE I/O requests) to a redirection server process created for the session.

At operation 312, a redirection server process (e.g., such as redirection server process 132 in FIG. 1) is created for the first session, such that local files and/or folders on client device 140 may be redirected to the remote desktop (e.g., when requested by an application 126 on the remote desktop), thereby allowing a user to access the local files and/or folders in the remote desktop like a mounted network drive. Further, at operation 314, redirection server process 132 associated with the session is launched.

At operation 316, the RDS plugin on the remote desktop assigns the client communication port (e.g., created by mini-filter 134 at operation 310) to redirection server process 132 to enable communication between mini-filter 134 and redirection server process 132. For example, at operation 316, the RDS plugin (e.g., given the RDS plugin has administrator privileges) forks the client communication port (e.g., created with administrator privileges) such that the client communication port is duplicated, and one of the client communication ports is passed to redirection server process 132. After operation 316, mini-filter 134 may communicate with redirection server process 132, associated with this particular session, via the client communication port.

As mentioned, in certain aspects, mini-filter 134 supports multiple remote desktop sessions. Accordingly mini-filter 134 may establish communication with multiple redirection server processes 132, each redirection server process 132 being associated with a particular remote desktop session. Further, in certain aspects, mini-filter 134 maintains a connection context pool having key-value mappings of <session ID, connection context> where (1) the key is the session ID associated with a particular session and (2) the value is the connection context, where the connection context includes at least information about a client communication port which may be used to communicate with a redirection server process 132 created for the particular session.

Accordingly, at operation 318, mini-filter 134 creates an entry in the connection context pool maintained by mini-filter 134. In particular, mini-filter 134 adds a key-value pair to the connection context pool, where (1) a key of the key-value pair comprises the session ID of the first session and (2) a value of the key-value pair comprises the first port ID of the client communication port which may be used by mini-filter 134 to communicate with redirection server process 132 of the first session.

Figure 4:
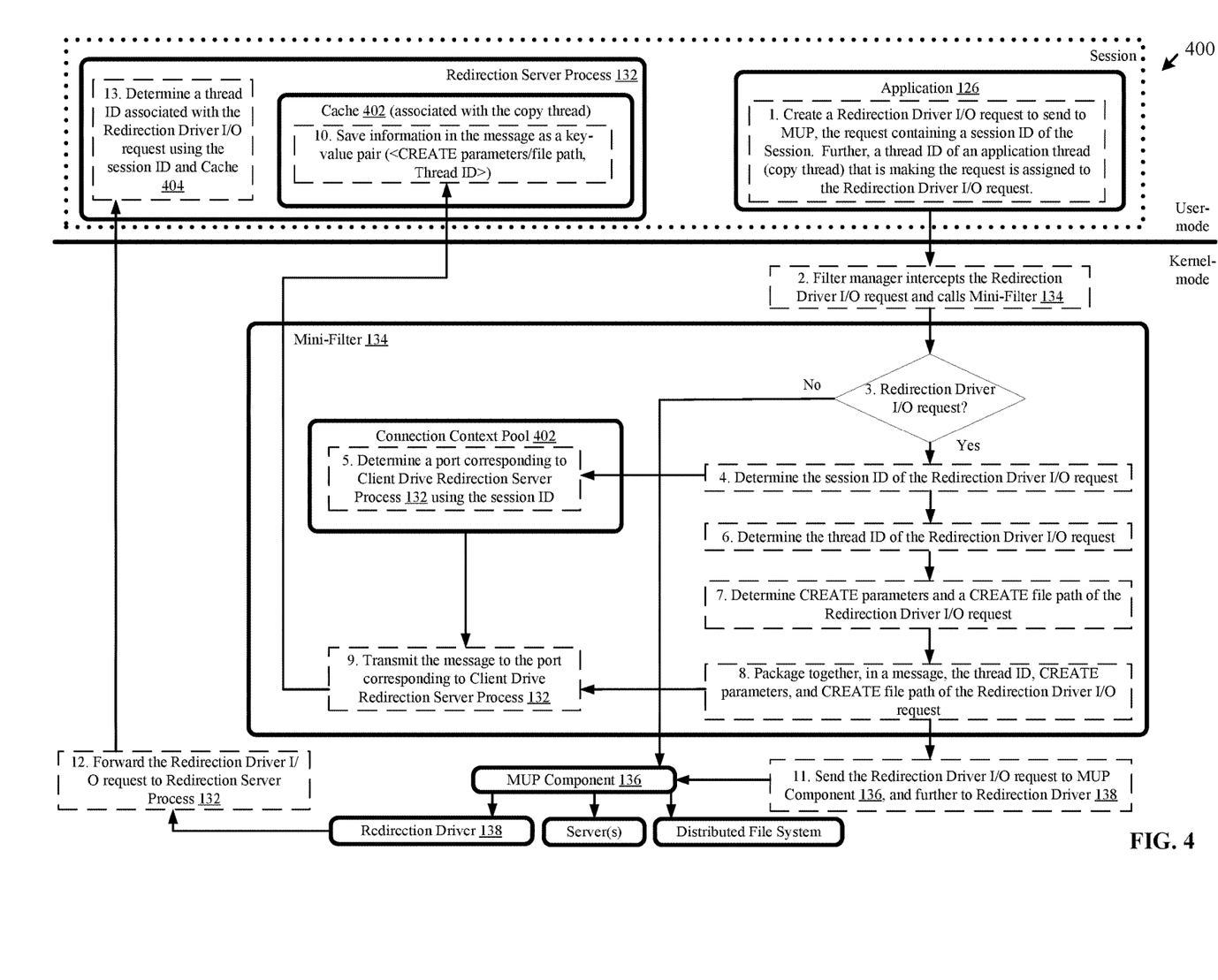
FIG. 4 depicts example operations for associating an I/O request with a thread context.

As described in more detail with respect to FIG. 4, when mini-filter 134 intercepts, for the first session, an IRP_MJ_CREATE I/O request from an application 126 running on the remote desktop, mini-filter 134 may determine which port to use (e.g., which port ID to use), to communicate thread context information to redirection server process 132 associated with the first session, by querying the connection context pool for a port ID of the client communication port assigned to this redirection server process 132.

It should be understood that operations 300 described with respect to FIG. 3 may be performed in any suitable alternative order, or in parallel. Further, it should be understood that, any additional or fewer steps performed in similar or alternative orders, or in parallel, with operations 300 may be possible.

FIG. 4 depicts example operations 400 for providing thread context for an I/O request. Operations 400 may be performed by one or more components on a remote desktop running on a VM. For example, operations 400 may be performed by an application 126, mini-filter 134, MUP 136, redirection driver 138, and redirection server process on VM 120, as illustrated in FIG. 1. Operations 400 may be performed to provide thread context to redirection server process 132 for an I/O request, and more specifically, a redirection driver I/O request to open a file and/or folder on client device 140 (e.g., an IRP_MJ_CREATE I/O request).

Operations 400 may occur subsequent in time to operations 300 described with respect to FIG. 3. As such, a first remote desktop session (e.g., first session), associated with a first session ID, between a remote desktop running on VM 120 and client device 140 may already be established. Further, a redirection server process 132 may be launched for the first session, and a client communication port may already be assigned to redirection server process 132 of the first session.

Operations 400 begin, at step 1, by an application 126 on the remote desktop creating a redirection driver I/O request. For example, an application thread of application 126 generates an IRP_MJ_CREATE I/O request to open a file 150 in storage 148 on client device 140. In certain aspects, the request contains the first session ID associated with the first session. The application thread may be a copy thread. Further, in certain aspects, the request may be assigned a thread context (e.g., a first thread ID) of the application thread generating the request. The thread context of the application thread may be unique to this particular thread of this particular application 126 generating the I/O request. The request (which may be subsequently intercepted by mini-filter 134) may not include the assigned thread context, however.

To redirect the redirection driver I/O request from VM 120 to client device 140, the redirection driver I/O request may need to be first sent to MUP component 136 of guest OS 122 on VM 120. Accordingly, application 126 may call NtCreateFile( ) system server to send the redirection driver I/O request to MUP component 136.

Prior to being received by MUP component 136, at step 2, a filter manager of a file system of guest OS 122 on VM 120, intercepts the redirection driver I/O request and calls mini-filter 134. In particular, the filter manager calls a preoperation callback routine of mini-filter 134. The filter manager is a kernel-mode driver that implements and exposes functionality commonly required in file system filter drivers.

At step 3, mini-filter 134 determines whether the I/O request is of a particular type. More specifically, at step mini-filter 134 determines whether the I/O request is a redirection driver I/O request or not. Where, at step 3, mini-filter 134 determines the request is a non-redirection driver I/O request, mini-filter 134 returns control of the I/O request back to the filter manager such that the I/O request is passed to MUP component 136 without first going through mini-filter 134.

On the other hand, where, at step 3, mini-filter 134 determines the request is a redirection driver I/O request, at step 4, mini-filter 134 determines a session ID of the I/O request. At step 5, mini-filter 134 uses this session ID as a key to determine a connection context, and more specifically a client communication port, associated with this session ID. For example, mini-filter 134 may query a connection context pool maintained at mini-filter 134 containing a plurality of key-value pairs of <session ID, connection context>. Mini-filter 134 may use the returned client communication port to determine a port to use for communicating thread context information (e.g., for the intercepted redirection driver I/O request) to a redirections server process 132 associated with the session ID.

At step 6, mini-filter 134 determines the thread ID assigned to the redirection driver I/O request. For example, as mentioned, when the filter manager intercepts the redirection driver I/O request, filter manager may call a preoperation callback routine of mini-filter 134. One preoperation callback routine of mini-filter 134 may be called in the context of the thread that originated the redirection driver I/O request. Accordingly, mini-filter 134 may call a system application programming interface (API) (e.g., API "PsGetCurrentThreadID) to query a thread ID of the current thread, where the current thread is also the thread that originated the redirection driver I/O request.

At step 7, mini-filter 134 determines parameters of the requested target file or folder. For example, at step 7, mini-filter 134 determines CREATE parameters and/or a CREATE file path of the intercepted redirection driver I/O request. At step 8, mini-filter 134 packages together, in a message, the thread ID, CREATE parameters, and/or the CREATE file path, to be sent to redirection server process 132. In some embodiments, both CREATE parameters and CREATE file paths may be referred to as "parameters" of a request.

At step 9, mini-filter 134 transmits the message (e.g., created at step 8) to redirection server process 132 via the client communication port determined at step 5. This client communication port is assigned to redirection server process 132 associated with the first session where the I/O request was generated.

At step 10, redirection server process 132 receives the message from mini-filter 134 and uses information in the message to create an entry in cache 402. Cache 402, also referred to herein as a thread context map, acts as a small, fast memory that stores recently accessed data. More specifically, cache 402 is used to store key-value mappings, where each key-value mapping may include (1) a key that includes information about CREATE parameters and/or a CREATE file path of a particular I/O request and (2) a value that includes a thread context (e.g., a thread ID) associated with the particular I/O request (e.g., <CREATE parameters and/or file path, thread ID>). Accordingly, at step 10, redirection server process 132 adds an entry to cache 402 as <CREATE parameters and/or file path of the redirection driver I/O request, first thread ID>).

In certain aspects, cache 402 is thread isolated. In other words, cache 402 may only store entries for I/O requests that are generated by an application thread associated with cache 402. For example, the application thread of application 126 generating the IRP_MJ_CREATE I/O request, at step 1, may be a copy thread of application 126. Thus, thread context information stored for this I/O request at redirection server process 132 may be stored in a cache 402 associated with this copy thread. Different caches 402 for different threads may help to maintain data consistency of thread context information for redirection driver I/O requests. For example, cached thread context information for I/Os of one copy thread may not interfere with cached thread context information for I/Os of other threads on redirected drives. Further, there may be a lesser change of evicting thread context information for the thread, given the thread is assigned its own cache 402.

At step 11, mini-filter 134 sends the intercepted redirection driver I/O request to MUP component 136, to be further sent to redirection driver 138. At step 12, redirection driver 138 forwards the redirection driver I/O request to redirection server process 132. At step 13, redirection server process 132 determines a thread context (e.g., thread ID) associated with the redirection driver I/O request using the CREATE parameters and/or CREATE file path of the I/O request and cache 402. For example, redirection server process 132 uses the CREATE parameters and/or the CREATE file path of the I/O request received from redirection driver 138 as a key to determine a thread context (e.g., the value) associated with that key among key-value pairs maintained in cache 402. Accordingly, redirection server process 132 may be successful to associate a thread context with the received I/O request from redirection driver 138.

Figure 5:
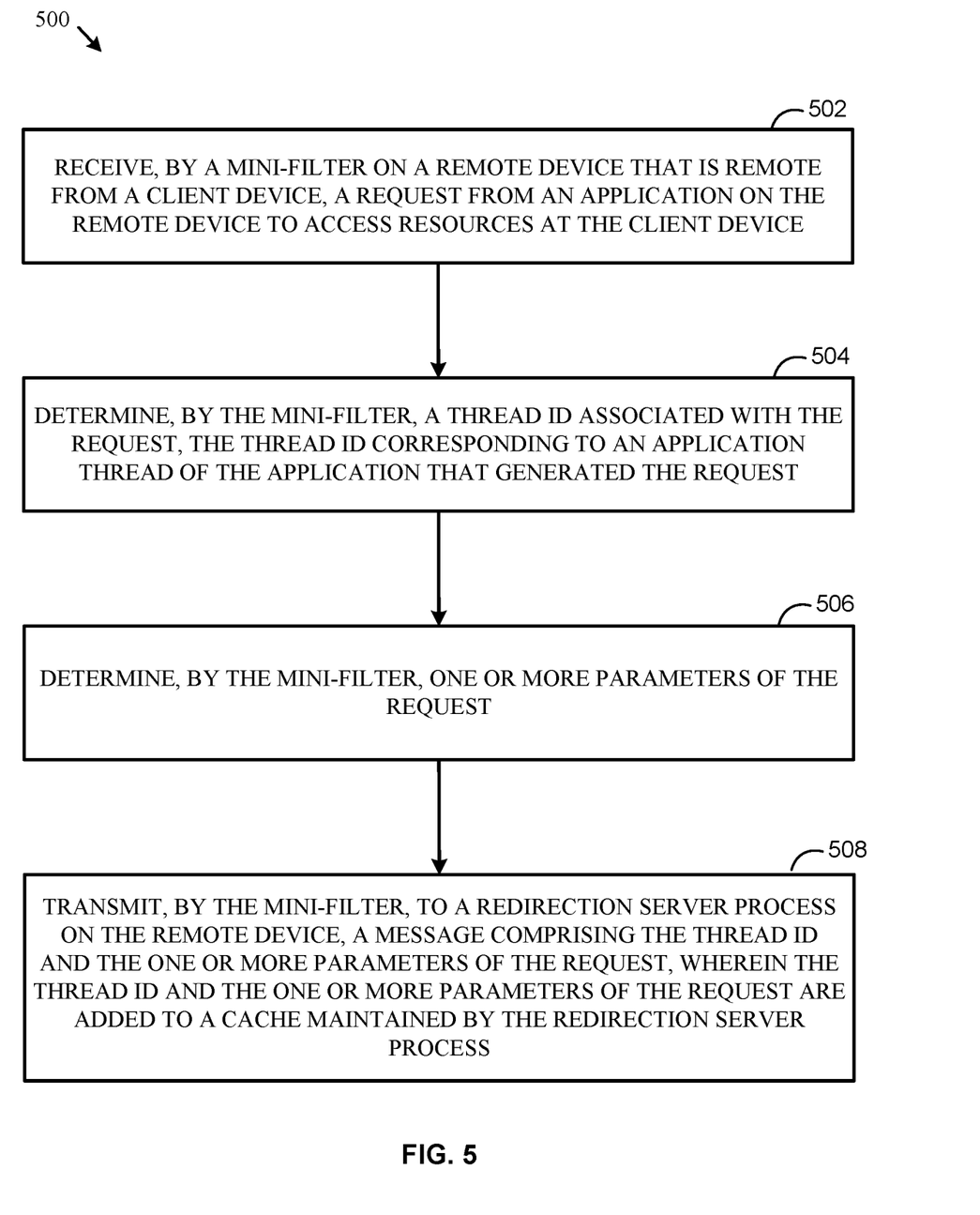
FIG. 5 depicts example operations related to associating thread identifiers (IDs) to I/O requests in a remote computing environment.

FIG. 5 illustrates example operations 500 related to associating thread identifiers (IDs) to input/output (I/O) requests in a remote computing environment. Operations 500 may be performed by one or more components of VM 120 on host 102 illustrated in FIG. 1. For example, operations 500 may be performed by mini-filter 134 and redirection server process 132 illustrated in FIG. 1.

Operations 500 begin at step 502, with receiving, by a mini-filter on a remote device that is remote from a client device, a request from an application on the remote device to access resources at the client device.

In certain aspects, prior to receiving the request from the application, operations 500 further include calling an application programming interface (API) to create a server communication port to communicate with the application.

Operations 500 continue at step 504, with determining, by the mini-filter, a thread ID associated with the request, the thread ID corresponding to an application thread of the application that generated the request.

Operations 500 continue at step 506, with determining, by the mini-filter, one or more parameters of the request.

Operations 500 continue at step 508, with transmitting, by the mini-filter, to a redirection server process on the remote device, a message comprising the thread ID and the one or more parameters of the request, wherein the thread ID and the one or more parameters of the request are added to a cache maintained by the redirection server process. In certain aspects, the thread ID and the one or more parameters of the request are added to the cache maintained by the redirection sever process as a first key-value mapping, the first key-value mapping comprising: a first key that is the one or more parameters of the request, and a first value that is the thread ID.

In certain aspects, operations 500 further include transmitting, by the mini-filter, to the redirection server process via a redirection driver, the request, wherein the redirection server process uses the one or more parameters of the request and the first key-value mapping added to the cache to determine the thread ID associated with the request.

In certain aspects, prior to receiving the request from the application, operations 500 further include determining a first session between the remote device and the client device has been established, wherein the first session is associated with a first session ID, creating, by the mini-filter, a first client communication port having a first port ID, assigning, by the mini-filter, the first client communication port to the redirection server process, wherein the redirection server process is associated with the first session, and adding a first key-value mapping for the first session to a data structure maintained by the mini-filter, the first key-value mapping comprising: a first key that is the session ID of the first session, and a first value comprising the first port ID of the first client communication port. The data structure maintained by the mini-filter may include a plurality of key-value mappings, wherein each of the plurality of key-value mappings is associated with a different session established between the remote device and the client device.

In certain aspects, the request comprises the first session ID associated with the first session, and operations 500 further include using the first session ID from the request to locate the first key-value mapping in the plurality of key-value mappings and determining to use the first client communication port for transmitting, to the redirection server process, the message based on the first port ID included in the first key-value mapping.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of associating thread identifiers (IDs) to input/output (I/O) requests in a remote computing environment, the method comprising:
receiving, by a mini-filter on a remote device that is remote from a client device, a storage I/O request from an application on the remote device to access a storage drive at the client device;
determining, by the mini-filter, a thread ID associated with the storage I/O request, the thread ID corresponding to an application thread of the application that generated the storage I/O request;
determining, by the mini-filter, one or more parameters of the storage I/O request;
transmitting, by the mini-filter, to a redirection server process on the remote device, a message comprising the thread ID and the one or more parameters of the storage I/O request, wherein the thread ID and the one or more parameters of the storage I/O request are added to a cache maintained by the redirection server process;
establishing a virtual channel between the redirection server process and a redirection client process executing on the client device; and
redirecting the storage I/O request from the redirection server process to the redirection client process over the virtual channel, wherein the thread ID in the cache is used to prefetch, from the storage drive on the client device, additional data blocks that were not requested by the storage I/O request but which are contiguous with data blocks requested by the storage I/O request.

2. The method of claim 1, wherein:
the thread ID and the one or more parameters of the storage I/O request are added to the cache maintained by the redirection server process as a first key-value mapping, the first key-value mapping comprising:
a first key that is the one or more parameters of the storage I/O request, and
a first value that is the thread ID.

3. The method of claim 2, further comprising:
transmitting, by the mini-filter, to the redirection server process via a redirection driver, the storage I/O request, wherein the redirection server process uses the one or more parameters of the storage I/O request and the first key-value mapping added to the cache to determine the thread ID associated with the storage I/O request.

4. The method of claim 1, wherein prior to receiving the storage I/O request from the application, the method further comprises:
determining a first session between the remote device and the client device has been established, wherein the first session is associated with a first session ID;
creating, by the mini-filter, a first client communication port having a first port ID;
assigning, by the mini-filter, the first client communication port to the redirection server process, wherein the redirection server process is associated with the first session; and
adding a first key-value mapping for the first session to a data structure maintained by the mini-filter, the first key-value mapping comprising:
a first key that is the session ID of the first session, and
a first value comprising the first port ID of the first client communication port.

5. The method of claim 4, wherein the data structure maintained by the mini-filter comprises a plurality of key-value mappings, wherein each of the plurality of key-value mappings is associated with a different session established between the remote device and the client device.

6. The method of claim 5, wherein:
the storage I/O request comprises the first session ID associated with the first session; and
the method further comprises:
using the first session ID from the storage I/O request to locate the first key-value mapping in the plurality of key-value mappings; and
determining to use the first client communication port for transmitting, to the redirection server process, the message based on the first port ID included in the first key-value mapping.

7. The method of claim 1, wherein prior to receiving the storage I/O request from the application, the method further comprises:
calling an application programming interface (API) to create a server communication port to communicate with the application.

8. A system comprising:
one or more processors; and
at least one memory, the one or more processors and the at least one memory configured to cause the system to:
receive, by a mini-filter on a remote device that is remote from a client device, a storage I/O request from an application on the remote device to access a storage drive at the client device;
determine, by the mini-filter, a thread ID associated with the storage I/O request, the thread ID corresponding to an application thread of the application that generated the storage I/O request;
determine, by the mini-filter, one or more parameters of the storage I/O request;
transmit, by the mini-filter, to a redirection server process on the remote device, a message comprising the thread ID and the one or more parameters of the storage I/O request, wherein the thread ID and the one or more parameters of the storage I/O request are added to a cache maintained by the redirection server process;
establish a virtual channel between the redirection server process and a redirection client process executing on the client device; and
redirect the storage I/O request from the redirection server process to the redirection client process over the virtual channel, wherein the thread ID in the cache is used to prefetch, from the storage drive on the client device, additional data blocks that were not requested by the storage I/O request but which are contiguous with data blocks requested by the storage I/O request.

9. The system of claim 8, wherein:
the thread ID and the one or more parameters of the storage I/O request are added to the cache maintained by the redirection server process as a first key-value mapping, the first key-value mapping comprising:
a first key that is the one or more parameters of the storage I/O request, and
a first value that is the thread ID.

10. The system of claim 9, wherein the one or more processors and the at least one memory are further configured to cause the system to:
transmit, by the mini-filter, to the redirection server process via a redirection driver, the storage I/O request, wherein the redirection server process uses the one or more parameters of the storage I/O request and the first key-value mapping added to the cache to determine the thread ID associated with the storage I/O request.

11. The system of claim 8, wherein prior to receiving the storage I/O request from the application, the one or more processors and the at least one memory are further configured to cause the system to:
determine a first session between the remote device and the client device has been established, wherein the first session is associated with a first session ID;
create, by the mini-filter, a first client communication port having a first port ID;
assign, by the mini-filter, the first client communication port to the redirection server process, wherein the redirection server process is associated with the first session; and
add a first key-value mapping for the first session to a data structure maintained by the mini-filter, the first key-value mapping comprising:
a first key that is the session ID of the first session, and
a first value comprising the first port ID of the first client communication port.

12. The system of claim 11, wherein the data structure maintained by the mini-filter comprises a plurality of key-value mappings, wherein each of the plurality of key-value mappings is associated with a different session established between the remote device and the client device.

13. The system of claim 12, wherein:
the storage I/O request comprises the first session ID associated with the first session; and
the one or more processors and the at least one memory are further configured to cause the system to:
use the first session ID from the storage I/O request to locate the first key-value mapping in the plurality of key-value mappings; and
determine to use the first client communication port for transmitting, to the redirection server process, the message based on the first port ID included in the first key-value mapping.

14. The system of claim 8, wherein prior to receiving the storage I/O request from the application, the one or more processors and the at least one memory are further configured to cause the system to:
call an application programming interface (API) to create a server communication port to communicate with the application.

15. A non-transitory computer-readable medium comprising instructions that, when executed by one or more processors of a computing system, cause the computing system to perform operations for associating thread identifiers (IDs) to input/output (I/O) requests in a remote computing environment, the operations comprising:
receiving, by a mini-filter on a remote device that is remote from a client device, a storage I/O request from an application on the remote device to access a storage drive at the client device;
determining, by the mini-filter, a thread ID associated with the storage I/O request, the thread ID corresponding to an application thread of the application that generated the storage I/O request;
determining, by the mini-filter, one or more parameters of the storage I/O request;
transmitting, by the mini-filter, to a redirection server process on the remote device, a message comprising the thread ID and the one or more parameters of the storage I/O request, wherein the thread ID and the one or more parameters of the storage I/O request are added to a cache maintained by the redirection server process;
establishing a virtual channel between the redirection server process and a redirection client process executing on the client device; and
redirecting the storage I/O request from the redirection server process to the redirection client process over the virtual channel, wherein the thread ID in the cache is used to prefetch, from the storage drive on the client device, additional data blocks that were not requested by the storage I/O request but which are contiguous with data blocks requested by the storage I/O request.

16. The non-transitory computer-readable medium of claim 15, wherein:
the thread ID and the one or more parameters of the storage I/O request are added to the cache maintained by the redirection server process as a first key-value mapping, the first key-value mapping comprising:
a first key that is the one or more parameters of the storage I/O request, and
a first value that is the thread ID.

17. The non-transitory computer-readable medium of claim 16, wherein the operations further comprise:
transmitting, by the mini-filter, to the redirection server process via a redirection driver, the storage I/O request, wherein the redirection server process uses the one or more parameters of the storage I/O request and the first key-value mapping added to the cache to determine the thread ID associated with the storage I/O request.

18. The non-transitory computer-readable medium of claim 15, wherein prior to receiving the storage I/O request from the application, the operations further comprise:
determining a first session between the remote device and the client device has been established, wherein the first session is associated with a first session ID;
creating, by the mini-filter, a first client communication port having a first port ID;
assigning, by the mini-filter, the first client communication port to the redirection server process, wherein the redirection server process is associated with the first session; and
adding a first key-value mapping for the first session to a data structure maintained by the mini-filter, the first key-value mapping comprising:
a first key that is the session ID of the first session, and
a first value comprising the first port ID of the first client communication port.

19. The non-transitory computer-readable medium of claim 18, wherein the data structure maintained by the mini-filter comprises a plurality of key-value mappings, wherein each of the plurality of key-value mappings is associated with a different session established between the remote device and the client device.

20. The non-transitory computer-readable medium of claim 19, wherein:
the storage I/O request comprises the first session ID associated with the first session; and
the operations further comprise:
using the first session ID from the storage I/O request to locate the first key-value mapping in the plurality of key-value mappings; and
determining to use the first client communication port for transmitting, to the redirection server process, the message based on the first port ID included in the first key-value mapping.

* * * * *